(12) United States Patent
Schmidt et al.

(10) Patent No.: US 10,359,534 B2
(45) Date of Patent: *Jul. 23, 2019

(54) EMU IMPULSE ANTENNA WITH CONTROLLED DIRECTIONALITY AND IMPROVED IMPEDANCE MATCHING

(71) Applicant: Saudi Arabian Oil Company, Dhahran (SA)

(72) Inventors: Howard K. Schmidt, Dhahran (SA); Erika Ellis, Dhahran (SA); Jesus Manuel Felix Servin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,123

(22) Filed: Jan. 23, 2018

(65) Prior Publication Data

US 2018/0267195 A1 Sep. 20, 2018

Related U.S. Application Data

(63) Continuation-in-part of application No. 15/458,772, filed on Mar. 14, 2017.

(51) Int. Cl.
*G01D 7/00* (2006.01)
*G01V 3/20* (2006.01)
*G01V 3/30* (2006.01)

(52) U.S. Cl.
CPC . *G01V 3/20* (2013.01); *G01V 3/30* (2013.01)

(58) Field of Classification Search
CPC .. G01D 5/145; G01D 5/24495; G01D 5/2452; G01D 5/2454; G01D 5/2458;
(Continued)

(56) References Cited

U.S. PATENT DOCUMENTS 3,146,351 A * 8/1964 Adams ............... G01V 5/102
336/207
3,238,477 A 3/1966 Brueckmann
(Continued)

FOREIGN PATENT DOCUMENTS

EP 2884309 A2 6/2015
WO 2008033225 A2 3/2008
(Continued)

OTHER PUBLICATIONS

International Search Report and Written Opinion for International Application No. PCT/US2018/022294, dated Jul. 6, 2018 (pp. 1-16).

(Continued)

*Primary Examiner* — Jermele M Hollington
*Assistant Examiner* — Taqi R Nasir
(74) *Attorney, Agent, or Firm* — Bracewell LLP; Constance G. Rhebergen; Linda L. Morgan (57) ABSTRACT

An electromagnetic energy source for emitting pulses of electromagnetic energy includes a sonde assembly and an energy storage capacitor. The energy storage capacitor has an electrode mounted in the sonde assembly and operable to generate an electric field, and a capacitive charge storage medium surrounding the electrode. A communication cable extends through a tubular member to the electrode. A fast-closing switch is positioned such that when the fast-closing switch is in a closed position, a circuit is formed that discharges the electrode.

14 Claims, 3 Drawing Sheets

(58) Field of Classification Search
CPC ...... G01D 5/246; G01D 5/249; G01D 5/2497;
G01D 5/345; G01D 5/34707; G01D
5/34715; G01D 7/00
USPC ............ 324/201–207.26, 259, 174, 146, 152
See application file for complete search history.

(56) References Cited

U.S. PATENT DOCUMENTS

| | | | |
|---|---|---|---|
| 4,109,522 A | 8/1978 | Thompson | |
| 4,246,586 A | 1/1981 | Henderson et al. | |
| 4,430,653 A | 2/1984 | Coon et al. | |
| 4,498,086 A | 2/1985 | Sandler | |
| 4,661,700 A | 4/1987 | Holenka | |
| 4,785,247 A * | 11/1988 | Meador | E21B 47/011 324/338 |
| 4,876,450 A | 10/1989 | Montgomery | |
| 5,041,922 A * | 8/1991 | Wood | G11B 5/00 360/131 |
| 5,192,952 A | 3/1993 | Johler | |
| 5,280,284 A | 1/1994 | Johler | |
| 5,302,895 A * | 4/1994 | Philpot | G01V 3/107 324/220 |
| 5,323,114 A | 6/1994 | Nagamune et al. | |
| 5,373,443 A * | 12/1994 | Lee | G01V 3/30 324/338 |
| 6,043,947 A * | 3/2000 | Gooch | G11B 5/00 360/115 |
| 6,061,633 A | 5/2000 | Fukuhara et al. | |
| 6,483,310 B1 * | 11/2002 | Meador | G01V 3/28 324/338 |
| 6,651,739 B2 | 11/2003 | Arndt et al. | |
| 6,753,814 B2 | 6/2004 | Killen et al. | |
| 7,477,162 B2 | 1/2009 | Clark | |
| 8,030,934 B2 | 10/2011 | Barsukov et al. | |
| 8,664,587 B2 | 3/2014 | Evans et al. | |
| 8,810,247 B2 * | 8/2014 | Kuckes | E21B 47/02216 324/346 |
| 8,917,094 B2 * | 12/2014 | Bittar | G01V 3/26 166/245 |
| 8,957,683 B2 | 2/2015 | Bittar et al. | |
| 9,206,645 B2 * | 12/2015 | Hallundbæk | E21B 17/02 |
| 9,490,518 B1 | 11/2016 | Herbsommer et al. | |
| 9,520,649 B2 | 12/2016 | De Rochemont | |
| 9,568,635 B2 | 2/2017 | Suhami | |
| 2005/0030036 A1 | 2/2005 | Hunziker et al. | |
| 2006/0151863 A1 | 7/2006 | Das et al. | |
| 2006/0203613 A1 | 9/2006 | Thomsen et al. | |
| 2007/0209799 A1 | 9/2007 | Vinegar et al. | |
| 2007/0294036 A1 | 12/2007 | Strack et al. | |
| 2008/0036452 A1 * | 2/2008 | Hirayama | H04M 1/0233 324/207.2 |
| 2009/0133870 A1 | 5/2009 | Pavlov et al. | |
| 2009/0150077 A1 | 6/2009 | Stoller et al. | |
| 2009/0179649 A1 * | 7/2009 | Schmidt | G01V 3/26 324/345 |
| 2009/0204330 A1 | 8/2009 | Thomsen et al. | |
| 2009/0205899 A1 | 8/2009 | Geerits et al. | |
| 2009/0224610 A1 | 9/2009 | Fuks et al. | |
| 2009/0240436 A1 * | 9/2009 | Heigl | G01V 1/48 702/11 |
| 2010/0060381 A1 | 3/2010 | Das et al. | |
| 2010/0085041 A1 * | 4/2010 | Pozidis | B82Y 15/00 324/207.21 |
| 2010/0155128 A1 * | 6/2010 | Tombs | H05K 3/102 174/262 |
| 2010/0155138 A1 * | 6/2010 | Kuckes | E21B 47/022 175/45 |
| 2010/0171426 A1 | 7/2010 | Kloss et al. | |
| 2011/0108283 A1 | 5/2011 | Srnka et al. | |
| 2011/0198078 A1 | 8/2011 | Harrigan et al. | |
| 2011/0227577 A1 | 9/2011 | Zhang et al. | |
| 2011/0255371 A1 | 10/2011 | Jing et al. | |
| 2012/0120767 A1 | 5/2012 | Vu et al. | |
| 2012/0201096 A1 | 8/2012 | Valero et al. | |
| 2013/0006535 A1 * | 1/2013 | Zhang | G01V 5/08 702/7 |
| 2013/0066587 A1 * | 3/2013 | Kalathil | G01D 5/06 702/150 |
| 2013/0088364 A1 | 4/2013 | Bittar et al. | |
| 2013/0146756 A1 | 6/2013 | Schmidt | |
| 2013/0249705 A1 * | 9/2013 | Sharp | E21B 47/0905 340/854.7 |
| 2013/0319685 A1 * | 12/2013 | Pike | E21B 41/00 166/378 |
| 2014/0060804 A1 * | 3/2014 | Barbour | E21B 37/00 166/70 |
| 2014/0183694 A1 * | 7/2014 | Gardner | H01L 28/90 257/532 |
| 2014/0275956 A1 * | 9/2014 | Fan | A61B 5/05 600/409 |
| 2014/0347055 A1 | 11/2014 | Schmidt | |
| 2015/0097561 A1 | 4/2015 | Desmulliez et al. | |
| 2015/0295651 A1 | 10/2015 | Herbsommer et al. | |
| 2015/0357121 A1 | 12/2015 | Andrakin | |
| 2016/0327677 A1 | 11/2016 | Fouda et al. | |
| 2017/0012361 A1 | 1/2017 | Prammer | |

FOREIGN PATENT DOCUMENTS

| | | |
|---|---|---|
| WO | 2016018377 A1 | 2/2016 |
| WO | 2016089387 A1 | 6/2016 |

OTHER PUBLICATIONS

International Search Report and Written Opinion, PCT/US2012/068367, dated Aug. 20, 2013.

Gao, B. et al.,"Ferrite Film Loaded Frequency Selective Metamaterials for Sub-GHz Applications", pp. 1-9, Materials 2016, 9(12), 1009.

Gong, B. et al; "Approach Trims Size of Dipole Antenna", Apr. 23, 2014.

Hwang, Y. et al., "Planar inverted F antenna loaded with high permittivity material", Electronics Letters, Sep. 28, 1995, pp. 1710-1712, vol. 31, Issue: 20, Shatin, NT, Hong Kong.

James, J.R. et al., "Electrically short monopole antennas with dielectric or ferrite coatings", Proceedings of the Institution of Electrical Engineers, vol. 125, Issue: 9; Sep. 1978, pp. 793-803.

Petrov, R.V., et al., "Antenna miniaturization with ferrite ferroelectric composites", Microwave and Optical Technology Letters, vol. 50, Issue 12, pp. 3154-3157, Dec. 2008.

Saenz, et al., "Resonant Meta-Surface Superstrate for Single and Multifrequency Dipole Antenna Arrays", IEEE Transactions on Antennas and Propagation, vol. 56 No. 4, pp. 951-960.

International Search Report and Written Opinion for related PCT application PCT/US2018/059585 dated Mar. 4, 2019; pp. 1-15.

International Search Report and Written Opinion for related PCT application PCT/US2018/062177 dated Mar. 4, 2019; pp. 1-17.

Subramanian et al., "High Dielectric Constant in $ACu_3Ti_4O_{12}$ and $ACu_3Ti_3FeO_{12}$ Phases", Journal of Solid State Chemistry, 2000, pp. 323-325, vol. 151, No. 2, Academic Press.

Thomas et al., "Nanoparticles of the giant dielectric material, $CaCu_3Ti_4O_{12}$ from a precursor route", Journal of Physics and Chemistry of Solids, 2008, pp. 1-47.

* cited by examiner

EMU IMPULSE ANTENNA WITH CONTROLLED DIRECTIONALITY AND IMPROVED IMPEDANCE MATCHING

CROSS REFERENCE TO RELATED APPLICATION

This application is a continuation of, and claims priority to and the benefit of, co-pending U.S. application Ser. No. 15/458,772, filed Mar. 14, 2017, titled "EMU Impulse Antenna," the full disclosure of which is incorporated in this disclosure by reference in its entirety for all purposes.

BACKGROUND

1. Field of the Disclosure

The present disclosure relates to imaging sub-surface structures, particularly hydrocarbon reservoirs and fluids within the hydrocarbon reservoirs, and more particularly to electromagnetic energy sources for electromagnetic surveying of sub-surface structures.

2. Description of the Related Art

Some electromagnetic (EM) surveying systems used in geophysics provide electromagnetic energy for traveling through a subsurface hydrocarbon reservoir for electromagnetic imaging of the subsurface hydrocarbon reservoir. Multiple sources and receivers can be positioned either in a bore that extends to the subsurface hydrocarbon reservoir or an earth surface over the subsurface hydrocarbon reservoir. In this way, the direction, velocity and saturation of injected fluids (such as during water flood) can be monitored. The system can also be used to locate by-passed oil and detect conductivity zones (such as fracture corridors and super-k zones) to provide early warning of water break-through. Such operations can assist in optimizing reservoir management and preventing oil bypass for improving volumetric sweep efficiency and production rates.

Some current EM systems cannot easily match impedance of the EM system to the geological matrix of the subsurface hydrocarbon reservoir for increasing transmission efficiency. Some current EM systems use a cable to provide power to the EM transmitter. However, these systems have been shown to have difficulty transferring a crisp pulse from the power supply down a cable, and then matching that pulse into the antenna. In addition, the cabling can also transmit a signal, which makes the resulting measurements unclear.

In some current systems, the system can be deployed by wireline under gravity tension in a vertical borehole or along a semi-rigid means, such as coiled tubing, if used in a horizontal or lateral borehole. Such deployment systems can introduce some asymmetry into the radiation pattern from the proximal half of the antenna, which could negatively impact data quality and interpretation of gathered data.

SUMMARY OF THE DISCLOSURE

Embodiments of this disclosure provide systems and methods for impedance matching to the formation and providing a symmetrical radiation pattern. Systems and methods of this disclosure are particularly suited for deployment in long term sub-surface applications.

Embodiments of this disclosure combine a slow-wave antenna with energy storage and pulse forming elements to form a high power, small aperture transmitting antenna that is suited for downhole electromagnetic interrogation technologies, such as for electromagnetic imaging of a subsurface hydrocarbon reservoir. Systems and methods described in this disclosure provide a transmitter that is compact, has an instantaneous high power output and generates a clean signal that is free of material ringing or distortion, such as a non-attenuated signal with a high signal to noise ratio. As used in this disclosure, a "high power" is considered to be a power in a range of a number of kilowatts to a number of megawatts.

Systems and methods of this disclosure eliminate external transmission lines to a switched power supply and radiate an electromagnetic pulse with a wavelength larger than the physical length of the antenna structure. The antenna elements of embodiments of this disclosure are used as capacitive energy storage elements. A fast-closing (normally open) switch, such as a triggered spark gap, is provided to initiate pulsed transmission. The magnitude and shape of the current pulse will depend on the voltage, capacitance, inductance and the resistance of the antenna elements and the resistance of the switch. As used in this disclosure, a "massive current" is considered to be in a current in the range of 100-1000 amperes (A) or more. Systems and methods of this disclosure therefore combine energy storage, pulse formation and radiating elements into a single structure, eliminating the need for impedance matching between separate distributed components for these respective functions.

Systems and methods of this disclosure further eliminate the problem of load matching between a power supply, cable or transmission-line, and antenna. With the energy storage element and switch inside the transmitting antenna element, the cable between the two is eliminated, minimizing reflections and losses in the system. As used in this disclosure, an "EMU" antenna is an acronym for an antenna having an electric permittivity (E), and a magnetic permeability (MU).

In an embodiment of this disclosure, an electromagnetic energy source for emitting pulses of electromagnetic energy includes a sonde assembly and an energy storage capacitor. The energy storage capacitor has an electrode mounted in the sonde assembly that is operable to generate an electric field, a capacitive charge storage medium surrounding the electrode, and a communication cable extending through a tubular member to the electrode. A fast-closing switch is positioned such that when the fast-closing switch is in a closed position, a circuit is formed that discharges the electrode.

In alternate embodiments of this disclosure, a high voltage power supply can be in communication with the electrode and in communication with the communication cable. The sonde assembly can include a downhole section axially aligned with, and spaced from, an uphole section, each of the downhole section and the uphole section having an energy storage capacitor. The communication cable can extend through the uphole section of the sonde assembly. Alternately, the tubular member can act as a ground.

In other alternate embodiments, the communication cable can be in communication with a high voltage power supply and can transmit a control signal. The capacitive charge storage medium can be formed of a material that includes iron particles and an epoxy matrix. The electromagnetic energy source can further include a plurality of electromagnetic energy sources emitting pulses of electromagnetic energy to travel through a subsurface hydrocarbon reservoir. The capacitive charge storage medium can have a magnetic permeability and electric permittivity selected to result in an impedance of the electromagnetic energy source that corresponds to an impedance of the subsurface hydrocarbon reservoir. The electromagnetic energy source can be movable to a succession of locations in a well borehole for emitting the pulses of electromagnetic energy at the succession of locations for travel through a subsurface hydrocarbon reservoir.

In an alternate embodiment of this disclosure, an electromagnetic energy source for emitting pulses of electromagnetic energy includes a sonde assembly having a downhole section axially aligned with, and spaced from, an uphole section. An energy storage capacitor includes an electrode mounted in each of the downhole section and the uphole section of the sonde assembly that is operable to generate an electric field, and a capacitive charge storage medium mounted in each of the downhole section and the uphole section of the sonde assembly and surrounding each electrode. A fast-closing switch is located between the electrode of the downhole section and the electrode of the uphole section of the sonde assembly. A communication cable extends through the uphole section of the sonde assembly.

In another alternate embodiment of this disclosure, an electromagnetic energy source for emitting pulses of electromagnetic energy has a sonde assembly and an energy storage capacitor. The energy storage capacitor includes an electrode mounted in the sonde assembly that is operable to generate an electric field and a capacitive charge storage medium surrounding the electrode. A communication cable extends through a tubular member to the electrode and the tubular member acts as a ground. A fast-closing switch is positioned between the electrode and the ground.

In alternate embodiments, the sonde assembly can extend from a downhole end of the tubular member. The communication cable can extend through the tubular member to a surface and the communication cable can provide a signal to the electrode.

In yet another alternate embodiment of this disclosure, a method for emitting pulses of electromagnetic energy with an electromagnetic energy source includes providing the electromagnetic energy source having a sonde assembly, and an energy storage capacitor including an electrode mounted in the sonde assembly that is operable to generate an electric field, and a capacitive charge storage medium surrounding the electrode. A communication cable extends through a tubular member to the electrode. A fast-closing switch is positioned such that when the fast-closing switch is in a closed position, a circuit is formed that discharges the electrode. The energy storage capacitor is charged to cause the fast-closing switch to close and pulses of electromagnetic energy to be emitted from the electromagnetic energy source.

In alternate embodiments the method can further include providing a high voltage power to the electrode with a high voltage power supply that is in communication with the communication cable. The sonde assembly can include a downhole section axially aligned with, and spaced from, an uphole section, each of the downhole section and the uphole section having an energy storage capacitor. The communication cable can extend through the uphole section of the sonde assembly. Alternately, the tubular member can act as a ground. The communication cable can be in communication with a high voltage power supply and transmits a control signal.

In other alternate embodiments, the electromagnetic energy source can further include a plurality of electromagnetic energy sources and the method can further include emitting pulses of electromagnetic energy to travel through a subsurface hydrocarbon reservoir. The method can further include moving the electromagnetic energy source to a succession of locations in a well borehole for emitting the pulses of electromagnetic energy at the succession of locations for travel through a subsurface hydrocarbon reservoir. The capacitive charge storage medium can be selected that has a magnetic permeability and electric permittivity that results in an impedance of the pulses that corresponds to an impedance of a subsurface hydrocarbon reservoir.

In another alternate embodiment of this disclosure, a method for electromagnetic imaging of a subsurface hydrocarbon reservoir includes lowering an electromagnetic energy source into a well borehole to a depth of interest in the subsurface hydrocarbon reservoir. The electromagnetic energy source includes a sonde assembly, an energy storage capacitor including an electrode mounted in the sonde assembly that is operable to generate an electric field, and a capacitive charge storage medium surrounding the electrode. A communication cable extends through a tubular member to the electrode. A fast-closing switch is positioned such that when the fast-closing switch is in a closed position, a circuit is formed that discharges the electrode. Pulses of electromagnetic energy are emitted with the electromagnetic energy source to travel through the subsurface hydrocarbon reservoir.

BRIEF DESCRIPTION OF THE DRAWINGS

So that the manner in which the recited features, aspects and advantages of the disclosure, as well as others that will become apparent, are attained and can be understood in detail, a more particular description of the embodiments of the disclosure previously briefly summarized may be had by reference to the embodiments that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION OF THE DISCLOSURE

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
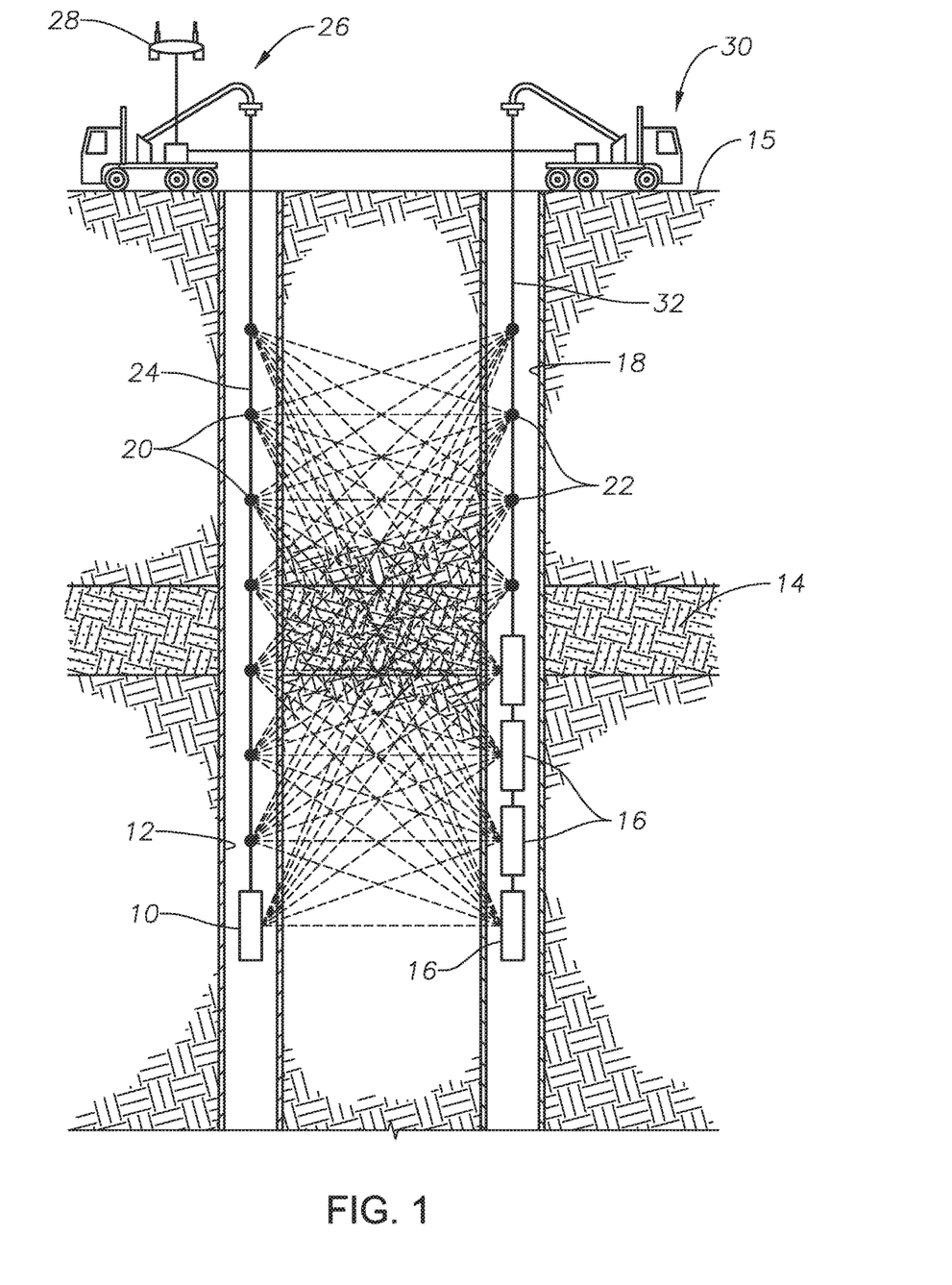
FIG. 1 is a schematic section view of a transmitter-receiver array for a borehole to borehole electromagnetic survey, in accordance with an embodiment of this disclosure.

Looking at FIG. 1, an example arrangement of a transmitter-receiver array for a borehole to borehole electromagnetic survey is shown. The transmitter can be electromagnetic energy source 10. Electromagnetic energy source 10 can be located within well borehole 12. Well borehole 12 can extend through subsurface hydrocarbon reservoir 14. Electromagnetic energy source 10 can emit pulses of electromagnetic energy to travel through subsurface hydrocarbon reservoir 14 for electromagnetic imaging of subsurface hydrocarbon reservoir 14.

Although one electromagnetic energy source 10 is shown in the example of FIG. 1, in alternate embodiments, multiple electromagnetic energy sources 10 can be located within well borehole 12. Alternately, one or more electromagnetic energy sources 10 can be located at the earth surface 15 over the subsurface hydrocarbon reservoir. In the example of FIG. 1, a series of electromagnetic sensors 16 are located in sensor bore 18. Sensor bore 18 can be a borehole that extends through subsurface hydrocarbon reservoir 14, and spaced apart from well borehole 12. In alternate embodiments, electromagnetic sensors 16 can be in an array (not shown) over the earth surface 15 over subsurface hydrocarbon reservoir 14. When electromagnetic energy source 10 is located in well borehole 12 and electromagnetic sensors 16 are located over the earth surface 15, the arrangement is known as a borehole to surface array. Generally either or both of the electromagnetic energy source 10 and electromagnetic sensors 16 are located within a borehole so that the EM signals pass through subsurface hydrocarbon reservoir 14 when traveling from electromagnetic energy source 10 to electromagnetic sensors 16. Electromagnetic sensors 16 can form a measure of the arrival time of the emitted pulses from electromagnetic energy source 10 to image subsurface hydrocarbon reservoir 14.

As can be seen in FIG. 1, a multitude of EM energy measurements can be performed with different combinations of transmitter locations 20 and receiver locations 22 in order to sample various parts of the subterranean features from different directions, including subsurface hydrocarbon reservoir 14. Both the electromagnetic energy source 10 and electromagnetic sensors 16 can be a part of a downhole tool or located in a tool and can be movable to between a succession of locations, such as between transmitter locations 20 and receiver locations 22.

Electromagnetic energy source 10 can be attached to installation string 24 for travel in well borehole 12 to a depth of interest. Installation string 24 extends from vehicle 26 at the surface and can be, for example, a wireline or coiled tubing. System control unit 28 can be associated with vehicle 26 and can be used to control the pulses emitted by electromagnetic energy source 10. A second vehicle 30 can have a receiver wireline 32 for attaching to electromagnetic sensors 16 and for moving electromagnetic sensors 16 within sensor bore 18. Electromagnetic energy source 10 can include a half wave or quarter wave dipole antenna, or a monopole antenna.

Figure 2:
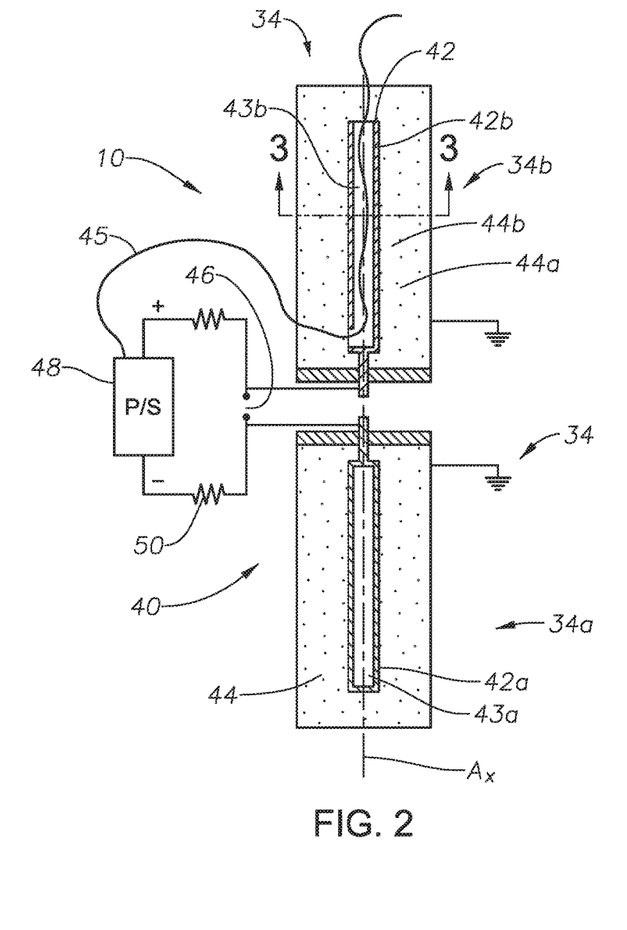
FIG. 2 is a schematic section view of an electromagnetic energy source and storage capacitor, in accordance with an embodiment of this disclosure.
Figure 3:
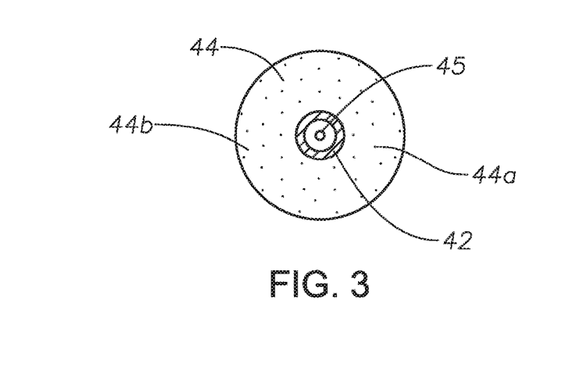
FIG. 3 is a schematic cross section view of the electromagnetic energy source of FIG. 2.

Looking at FIGS. 2-3, example embodiment of electromagnetic energy source 10 includes sonde assembly 34. Sonde assembly 34 of such embodiment has two main sections: downhole section 34a is axially aligned with, and spaced from, uphole section 34b. Electromagnetic energy source 10 also includes energy storage capacitor 40 with capacitive charge storage medium 44.

An electrode 42 is mounted in each of downhole section 34a and uphole section 34b of sonde assembly 34. Downhole electrode 42a is located in downhole section 34a and uphole electrode 42b is located in uphole section 34b. Electrode 42 can be an elongated member and have a tubular shape. Electrode 42 can be formed of copper, and in alternate embodiments, can be formed of silver, aluminum, gold, graphite, or other material with sufficient conductivity, corrosion resistance and hardness suitable for use as an electrode. Downhole electrode 42a can be part of sonde assembly 34. Downhole electrode 42a can include a downhole open central bore 43a. In alternate embodiments, downhole electrode 42a can be a solid tubular shaped member. Uphole electrode 42b can be part of sonde assembly 34. Uphole electrode 42b can include uphole open central bore 43b so that uphole electrode 42b is a tubular member. Uphole open central bore 43b can include an opening proximate to an uphole end of uphole electrode 42b so that communication cable 45 can pass into uphole open central bore 43b of uphole electrode 42b.

Communication cable 45 can travel through uphole open central bore 43b and exit out of uphole open central bore 43b proximate to a downhole end of uphole electrode 42b. Communication cable 45 can be in communication with high voltage power supply 48 and can transmit a control signal from system control unit 28 (FIG. 1) to control the pulses emitted by electromagnetic energy source 10.

Each half of the dipole is initially held at a high voltage relative to one another. The voltage will be dependent on the capacitance and impedance of the circuit, as well as dimensions of the antenna, and will change with the frequency of operation of the antenna. The voltage of one half of the dipole is equal and opposite of the voltage of the other half of the dipole, with the outermost end of each half therefore having the greatest magnitude of voltage. As used in this disclosure, "high voltage" can a voltage in a range 1000 volts (V) and greater. The pair of antennas is biased apart by a large voltage so that the structure can discharge in a single massive current pulse and emit a high power transient signal.

The capacitive charge storage medium 44 is mounted in each of the downhole section 34a and the uphole section 34b of the sonde assembly 34. Capacitive charge storage medium 44 can be formed of a material that is selected so that the electric permittivity and magnetic permeability of such material optimizes transmitter impedance to match the external medium. This increases the capacitance and inductance of the system and decreases the group velocity of the pulses emitted by electromagnetic energy source 10, to define a slow-wave antenna.

A slow wave refers to the group velocity of the EM wave travelling along the structure. The group velocity can be made slower by changing the electromagnetic properties of the guiding structure or in particular the cladding around the guidewire according to the formula:

$$V \propto \frac{1}{\sqrt{\varepsilon_r \mu_r}}$$

where V=wave velocity, εr is the dielectric constant, and μr is the relative magnetic permeability.

The slower group velocity of the EM waves allows a proportional reduction in the physical length of the antenna. A slower group velocity is especially important for lower frequency applications, such as applications with frequencies in the 10 kHz-1 MHz range, with very large wavelengths, such as where the length of the antenna corresponding to one quarter of the resonant wavelength of the non-cladded antenna is hundreds of meters.

Providing a capacitive charge storage medium 44 of embodiments of this disclosure can materially decrease the length of an antenna structure for a given wavelength emitted. As an example, capacitive charge storage medium 44 can be formed of a material that includes ferrite, steel, permalloy, TiO2, lead zirconate titanate, magnetite, other iron particles, or a mix of any such materials. Such particles 44a can be mixed in an epoxy matrix 44b. The specific composition of the mixture used for capacitive charge storage medium 44 would depend on the properties of the reservoir materials and the geometry of the antenna, as further described in this disclosure. In an example embodiment, capacitive charge storage medium 44 can have particles 44a with a relative electric permittivity of 100 and a relative magnetic permeability of 100 and consist of both TiO2 and magnetite. The relative electric permittivity of a material is known as the dielectric constant of the material divided by the dielectric constant of free space. In other alternate embodiments, the relative magnetic permeability of particles 44a can be in a range of 1 to 100,000. These particles 44a can be located in a 1:1 mixture in an insulating epoxy matrix 44b. This example embodiment would result in an overall relative electric permittivity in the range of 40, and a magnetic permeability in the range of 40 after considering the linear combination of the components, in accordance with effective medium theory. This example embodiment will result in an effective antenna that performs as though it is in the range of forty times larger than the actual length of the antenna.

Figure 4:
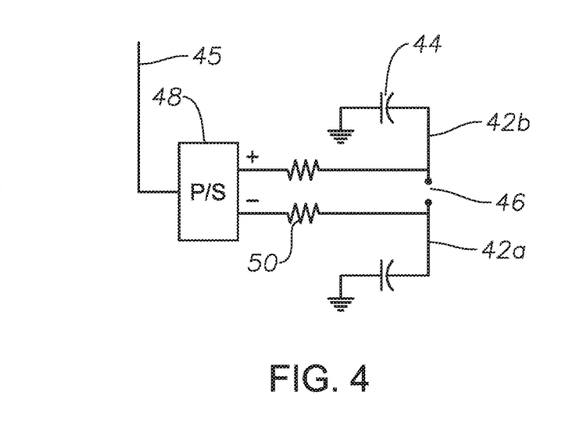
FIG. 4 is a schematic cross section view of the electromagnetic energy source of FIG. 2.

Looking at FIGS. 2-4, electromagnetic energy source 10 can further include fast-closing switch 46, which is located between downhole and uphole electrodes 42a, 42b of downhole and uphole sections 34a, 34b, respectively. When fast-closing switch is closed, such as when the spark gap is broken down, electromagnetic energy source 10 will generate an electromagnetic pulse. Fast-closing switch 46 is positioned such that when fast-closing switch 46 is in a closed position, a circuit is transiently formed that connects electrodes 42a and 42b. Fast-closing switch 46 can be, for example, a spark gap.

As an example, when the potential difference between downhole and uphole electrodes 42a, 42b exceeds the breakdown voltage of a gas within the gap, an electric spark can pass between downhole and uphole electrodes 42a, 42b. In alternate embodiments, fast-closing switch 46 can include avalanche transistors, thyratrons, ignitrons, silicon-controlled rectifier, and triggered spark gaps. Fast-closing switch 46 can be selected to have performance metrics concerning peak current, peak voltage, useful number of shots, jitter, complexity and geometry that will suit the environment, conditions, and performance criteria for which the electromagnetic energy source 10 is to be used.

Electromagnetic energy source 10 can also have high voltage power supply 48 connected between downhole and uphole electrodes 42a, 42b. High voltage power supply 48 can have, for example, a voltage over 1,500 volts. Power can be provided to high voltage power supply 48 from outside of electromagnetic energy source 10 with pair of leads and by way of communication cable 45.

In the example embodiment of FIGS. 2-4, capacitive charge storage medium 44 acts as a ground. In such an embodiment, capacitive charge storage medium 44 proximate to electrode 42 will form energy storage capacitor 40 and capacitive charge storage medium 44 proximate to an outer diameter of capacitive charge storage medium 44 will act as the ground.

Current limiting resistors 50 can be located between high voltage power supply 48 and both of the downhole electrode 42a of the downhole section 34a and the uphole electrode 42b of the uphole section 34b. Current limiting resistors 50 can block current pulses from returning up the supply wire towards high voltage power supply 48. This will isolate the antenna system from high voltage power supply 48 while the electromagnetic pulse is being emitted.

Electrode 42 is centered along axis Ax of each of downhole section 34a and uphole section 34b of sonde assembly 34. Electrode 42 is sheathed within capacitive charge storage medium 44 so that capacitive charge storage medium 44 surrounds electrode 42. Energy storage capacitor 40 is formed by an electric field radiating out from electrode 42 and through the nearby capacitive charge storage medium 44. The amount of energy stored will vary with the square of the electric field. If electrode 42 has a small diameter, then almost all of the electric field potential drop will occur inside the capacitive charge storage medium 44.

Figure 5:
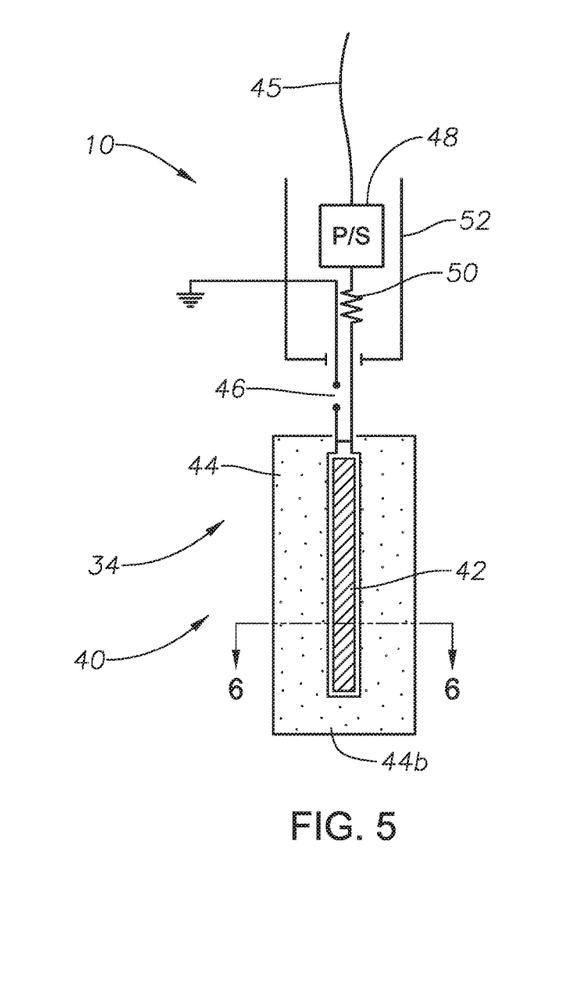
FIG. 5 is a schematic section view of an electromagnetic energy source and storage capacitor, in accordance with an embodiment of this disclosure.
Figure 6:
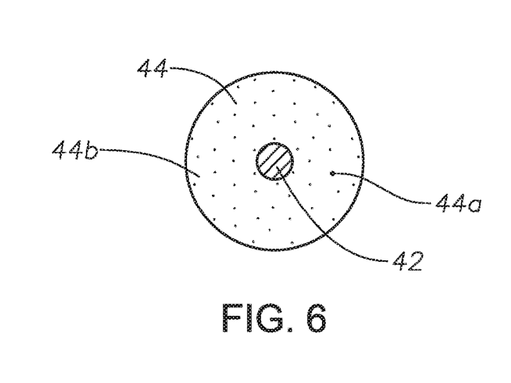
FIG. 6 is a schematic cross section view of the electromagnetic energy source of FIG. 5.
Figure 7:
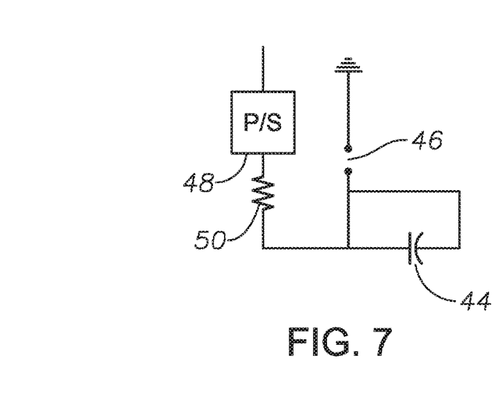
FIG. 7 is a schematic cross section view of the electromagnetic energy source of FIG. 5.

Looking at FIGS. 5-7, electromagnetic energy source 10 can alternately have a single electrode 42 of sonde assembly 34. In such an embodiment, communication cable 45 can extend downhole through a tubular member such as casing or coiled tubing 52 to high voltage power supply 48. High voltage power supply 48 is in communication with electrode 42. Electrode 42 is sheathed within capacitive charge storage medium 44 so that capacitive charge storage medium 44 surrounds electrode 42. Energy storage capacitor 40 is formed by an electric field radiating out from electrode 42 and through the nearby capacitive charge storage medium 44, that can have particles 44a that are mixed in epoxy matrix 44b.

Fast-closing switch 46, which is located between high voltage power supply 48 and coiled tubing 52, which acts as a ground for electromagnetic energy source 10. Fast-closing switch 46 is positioned such that when fast-closing switch 46 is in a closed position, a circuit is formed that discharges electrode 42. When fast-closing switch is closed, such as when the spark gap is broken down, electromagnetic energy source 10 will generate an electromagnetic pulse. Such a configuration can be particularly useful for permanent deployment in vertical wells where the well has casing to the top of the productive zone, while leaving subsurface hydrocarbon reservoir 14 open-hole. Such a configuration is may also be particularly useful for long term reservoir monitoring and estimating an average remaining oil column between adjacent wells.

Electromagnetic energy source 10 of embodiments of FIGS. 5-7 operates as a grounded half dipole antenna, or a monopole antenna. Because, the length of the antenna affects the resonant frequency, using the single electrode system of FIGS. 5-7 will affect the radiation efficiency as a function of wavelength. In addition, because the power density of the resulting pulse is a function of the direction of travel of the pulse, the use of the embodiment of FIGS. 5-7 will result in a radiation pattern that is different than the radiation pattern of the dipole arrangement of FIGS. 2-4. As an example, the vertical radiation pattern of the grounded dipole antenna, or monopole antenna, has a smaller angle of radiation giving it a longer-range propagation advantages at frequencies less than about 50 MHz as compared to the half wave dipole antenna of FIGS. 2-4.

In EM transmission systems, a factor to be considered is matching the impedance of all components in the system to maximize transfer efficiency and minimize reflection and ringing between each element. By including high voltage power supply 48 and fast-closing switch 46 as subterranean component of electromagnetic energy source 10, a transmission line that transmits the pulse from the surface is eliminated, which in turn eliminates a cause of ringing and inefficiency in the system.

An additional factor to be considered for improving the performance of EM transmission systems is matching the impedance of electromagnetic energy source 10 to the medium through which the pulses are transmitted. Subsurface geological structures can be comprised of rocks with porosity ranging from zero to about 25 percent (%). The pore space can be filled with water, which may have dissolved salts that affect the conductivity of the geological structure. Other pore spaces can be filled with liquid or gas hydrocarbons. Taken together, the rock matrix in and around subsurface hydrocarbon reservoir 14 can have a dielectric constant ranging from about 5 (such as for anhydrite or oil filled sandstone), to about 22 (such as for water filled limestone with 20% porosity).

The impedance (Z) of a medium can be calculated as shown in the following Equation 1:

$$Z = \sqrt{\frac{\mu}{\varepsilon}} \quad \text{Equation 1}$$

where $\mu$ is the magnetic permeability and $\varepsilon$ is the electric permittivity of the medium. As shown in Equation 1, the impedance of a medium is determined by the ratio of magnetic permeability to electric permittivity ($\mu/\varepsilon$ ratio).

The dielectric constant (k) of a material can be calculated as shown in Equation 2:

$$k = \varepsilon_r = \frac{\varepsilon}{\varepsilon_o} \quad \text{Equation 2}$$

so then, $$\varepsilon = \varepsilon_r \varepsilon_o = k \varepsilon_o \quad \text{Equation 3}$$

where $\varepsilon_o$ is the electric permittivity of free space. Using Equation 3 with Equation 1, the relationship between impedance and dielectric constant can be expressed as shown in Equation 4:

$$Z = \sqrt{\frac{\mu}{k \varepsilon_o}} \quad \text{Equation 4}$$

In Equation 4 it is shown that as the dielectric constant k increases, impedance Z decreases. And as magnetic permeability $\mu$ increases, so does the impedance Z of the medium.

Some current EM transmission systems are designed to match the impedance of free space, which is about 377Ω. Given their higher dielectric constant compared to free space, the impedance of the oil and brine filled portions of the reservoir can be in a range from about 80-170 ohms (Ω), depending on whether the reservoir includes brine or oil filled pores. Embodiments of the current application improve the performance of electromagnetic energy source 10 compared to EM transmission systems with an impedance of about 377Ω by tuning the ratio of magnetic permeability to electric permittivity while maintaining a desired product of magnetic permeability multiplied by electric permittivity, for miniaturization.

The materials used for capacitive charge storage medium 44 for electromagnetic energy source 10 can be selected depending on whether electromagnetic energy source 10 is to be used for oil or water filled rocks. As an example, if electromagnetic energy source 10 is to be used to survey water-flooded reservoirs, $\mu$ and $\varepsilon$ for electromagnetic energy source 10 would be selected to have a WE ratio in a range of 6400 to 100,000. Alternately, if electromagnetic energy source 10 is to be used to survey hydrocarbon producing reservoirs, $\mu$ and $\varepsilon$ for electromagnetic energy source 10 would be selected to have a WE ratio of 23000 to 30000.

Considering instead the ratio of relative magnetic permeability to relative electric permittivity, the relative magnetic permeability of the reservoir could be about 1. Depending on the porosity and amount of residual water, the relative electric permittivity of the reservoir could range from 10 for an original hydrocarbon filled reservoir, to 20 for a water filled or swept reservoir. Therefore, to optimize transmission efficiency, desirable ratios of relative magnetic permeability to relative electric permittivity in the sheathing material in the EMU antenna should be close to the ratio of the reservoir medium, such as in the range of 0.05 to 0.1.

The ratio of magnetic permeability to electric permittivity can be selected by using a mixture of magnetic and dielectric materials as part of capacitive charge storage medium 44, such as titania and magnetite as well as special ferrites that simultaneously display both increased magnetic permeability and electric permittivity. The ratio of magnetic permeability to electric permittivity can be tuned by adjusting the stoichiometry of the various metals in the ferrite. In such a way, capacitive charge storage medium 44 can have a magnetic permeability and electric permittivity selected to result in an impedance of electromagnetic energy source 10 that corresponds to an impedance of subsurface hydrocarbon reservoir 14.

As an example, a material with tunable properties can be used as part of capacitive charge storage medium 44. Such a material can be a ferrite that has the composition $Ti_x(MFe_2O_{4+2x/y})_y$, where $x+y=1$ and $0<x<1$. The metal M can be any one or several metals selected from the group of Mn, Ni, Cu, Mg, Li and Zn. Considering a ferrite with M=Ni (12%)+Cu(28%)+Zn(60%) as an example, such a composition is then $Ti_x(Ni_{0.12}Cu_{0.28}Zn_{0.6}Fe_2O_{4+2x/y})_y$. In embodiments of this application, such a ferrite with an $x=0.05$ fraction of Ti can be used for capacitive charge storage medium 44. Such a composition for capacitive charge storage medium 44 can maximize the product of magnetic permeability multiplied by electric permittivity, while maintaining the ratio of relative magnetic permeability to relative electric permittivity of about 0.10.

In some current EM transmission systems, the cable used to transmit power and control signals downhole to electromagnetic energy source 10 can be routed exterior of at least one of the electrodes 42. The use of such an external cable will introduce asymmetry into the radiation pattern from the electromagnetic energy source 10, which could negatively impact data quality and the interpretation of such data. Embodiments of this disclosure eliminate such asymmetry by either passing communication cable 45 through a tubular member to electrode 42. The tubular member through which communication cable 45 passes can be a central bore of uphole electrode 42*b* (FIG. 2), or can be casing or coiled tubing 52 in an embodiment having only one electrode 42, which is located downhole of communication cable 45 (FIG. 5).

In an example of operation, in order to form an electromagnetic image of subsurface hydrocarbon reservoir 14 electromagnetic energy source 10 can be mounted to, or part of, a well tool and lowered on installation string 24 into well borehole 12 to a depth of interest. Capacitive charge storage medium 44 of electromagnetic energy source 10 can be selected to have a magnetic permeability and electric permittivity selected to result in an impedance of electromagnetic energy source 10 that corresponds to an impedance of the subsurface hydrocarbon reservoir.

The downhole tool associated with electromagnetic energy source 10 can have a connector section with a mechanical connector that attaches to installation string 24, an electrical power connection, and a synchronizing signal connection. Such connector section and connections can be orientated similar to known current downhole tools. The downhole tool can house sonde assembly 34. Electromagnetic energy source 10 can be encased in a strong, insulating polymeric material to provide structural integrity while also allowing for the transmission of electromagnetic signals.

A single electromagnetic energy source 10 can be utilized, as shown in the example of FIG. 1. Alternately, a plurality of electromagnetic energy sources 10 can be lowered in well borehole 12. Pulses of electromagnetic energy can be emitted from the single electromagnetic energy source 10, or at each of the plurality of electromagnetic energy sources 10, as applicable, to travel through subsurface hydrocarbon reservoir 14 and a resulting signal can be received by electromagnetic sensors 16. An electromagnetic pulse with known characteristics is generated from the high power, pulsed electromagnetic energy source 10 from locations in or near subsurface hydrocarbon reservoir 14. In order to generate the electromagnetic pulse, high voltage power supply 48 charges up energy storage capacitor 40 through current limiting resistor 50 until fast-closing switch 46 is closed. With the fast-closing switch closed, electromagnetic energy source 10 will emit the pulse of electromagnetic energy. After the electromagnetic pulse is emitted, high voltage power supply 48 can recharge energy storage capacitor 40.

By combining energy storage, pulse formation and radiating elements into a single structure, the problem of impedance matching between separate distributed components of an electromagnetic survey system required for these respective functions is eliminated. Systems and methods of this disclosure therefore eliminate the problem of load matching between a power supply, cable or transmission-line, and antenna. With the energy storage element of energy storage capacitor 40 and fast-closing switch 46 both inside the transmitting antenna element of the pair of disclosed self-powered impulse antennas, the need for an external cable between the power source and the transmission element are eliminated, and reflections and losses in the system are minimized.

In addition, because the cable that provides a control signal to electromagnetic energy sources 10 and is associated with high voltage power supply 48 does not extend past an electrode 42, the resulting radiation pattern from the electromagnetic energy source 10 will have improved symmetry compared to systems where a power or communication cable extends exterior of an electrode 42.

A plurality of electromagnetic sensors 16 can be mounted to or part of a well tool and lowered in sensor bore 18 that extends through subsurface hydrocarbon reservoir 14. Alternately, the plurality of electromagnetic sensors 16 can be arranged in an array over an earth surface 15 over subsurface hydrocarbon reservoir 14. The emitted pulsed EM signal is transmitted through subsurface hydrocarbon reservoir 14 and recorded at one or more electromagnetic sensors 16 after travel through the subsurface formations surrounding well borehole 12 and sensor bore 18. The EM signal recorded by electromagnetic sensors 16 differs from the pulsed signal emitted by electromagnetic energy source 10 in characteristics such as time, amplitude, power spectrum, and other characteristics that depend on the properties of the intervening medium (such as the reservoir) and spatial variations of those properties.

Electromagnetic energy source 10 can be moved between a succession of locations, such as transmitter locations 20, in well borehole 12 for emitting pulses of electromagnetic energy at such succession of locations for travel through subsurface hydrocarbon reservoir 14. Similarly, electromagnetic sensors 16 can be moved between a succession of locations, such as receiver locations 22, to receive the resulting signal at such succession of locations. In this way, a more complete electromagnetic image can be formed of subsurface hydrocarbon reservoir 14.

Recording and processing instrumentation associated with system control unit 28 at the surface can receive and store information relating to the resulting signal received by electromagnetic sensors 16. System control unit 28 can also perform additional functions such as computerized analysis of the resulting signal, display certain results derived from the resulting signal, and store the resulting signal and computerized analysis on a computer for further processing and computerized analysis. System control unit 28 can, as an example, be used to form a measure of the arrival time of the emitted pulses at a plurality of electromagnetic sensors, and to analyze the measure of arrival time data from the plurality of electromagnetic sensors. From this information, a representation of subsurface features of the subsurface hydrocarbon reservoir, and an image of the representation of subsurface features of the subsurface hydrocarbon reservoir, can be formed.

Embodiments of this disclosure thus generate information about the spatial distribution and composition of fluids in a hydrocarbon reservoir. The operation can be repeated periodically to, as an example determine the direction, velocity and saturation of injected fluids, such as a water flood, or to visualize modified reservoir volume as a function of time. This can assist in optimizing reservoir management, preventing oil bypass and thereby improving volumetric sweep efficiency and production rates.

Embodiments of this disclosure have been sufficiently described so that a person with ordinary skill in the art may reproduce and obtain the results mentioned in this disclosure. Nonetheless, any skilled person in the field of technique, subject of this disclosure, may carry out modifications not described in this disclosure, to apply these modifications to a determined structure, or in the manufacturing process of the same, and such resulting structures shall be covered within the scope of this disclosure.

It should be noted and understood that there can be improvements and modifications made of the present embodiments described in detail in this disclosure without departing from the scope of the disclosure.

What is claimed is:

1. An electromagnetic energy source for emitting pulses of electromagnetic energy, the electromagnetic energy source comprising:
   a sonde assembly;
   an energy storage capacitor including:
      an electrode mounted in the sonde assembly and operable to generate an electric field; and
      a capacitive charge storage medium surrounding the electrode;
   a communication cable extending through a tubular member to the electrode; and
   a fast-closing switch positioned such that when the fast-closing switch is in a closed position, a circuit is formed that discharges the electrode.

2. The electromagnetic energy source according to claim 1, further including a high voltage power supply in communication with the electrode and in communication with the communication cable.

3. The electromagnetic energy source according to claim 1, where the sonde assembly includes a downhole section axially aligned with, and spaced from, an uphole section, each of the downhole section and the uphole section having an energy storage capacitor.

4. The electromagnetic energy source according to claim 3, where the communication cable extends through the uphole section of the sonde assembly.

5. The electromagnetic energy source according to claim 1, where the tubular member acts as a ground.

6. The electromagnetic energy source according to claim 1, where the communication cable is in communication with a high voltage power supply and transmits a control signal.

7. The electromagnetic energy source according to claim 1, where the capacitive charge storage medium is formed of a material that includes iron particles and an epoxy matrix.

8. The electromagnetic energy source according to claim 1, where the electromagnetic energy source further includes a plurality of electromagnetic energy sources emitting pulses of electromagnetic energy to travel through a subsurface hydrocarbon reservoir.

9. The electromagnetic energy source according to claim 8, where the capacitive charge storage medium has a magnetic permeability and electric permittivity selected to result in an impedance of the electromagnetic energy source that corresponds to an impedance of the subsurface hydrocarbon reservoir.

10. The electromagnetic energy source according to claim 1, where the electromagnetic energy source is movable to a succession of locations in a well borehole for emitting the pulses of electromagnetic energy at the succession of locations for travel through a subsurface hydrocarbon reservoir.

11. An electromagnetic energy source for emitting pulses of electromagnetic energy, the electromagnetic energy source comprising:
    a sonde assembly including a downhole section axially aligned with, and spaced from, an uphole section;
    an energy storage capacitor including:
       an electrode mounted in each of the downhole section and the uphole section of the sonde assembly and operable to generate an electric field; and
       a capacitive charge storage medium mounted in each of the downhole section and the uphole section of the sonde assembly and surrounding each electrode;
    a fast-closing switch located between the electrode of the downhole section and the electrode of the uphole section of the sonde assembly; and
    a communication cable extending through the electrode of the uphole section of the sonde assembly.

12. An electromagnetic energy source for emitting pulses of electromagnetic energy, the electromagnetic energy source comprising:
    a sonde assembly;
    an energy storage capacitor including:
       an electrode mounted in the sonde assembly and operable to generate an electric field; and
       a capacitive charge storage medium surrounding the electrode;
    a communication cable extending through a tubular member to the electrode, where the tubular member acts as a ground; and
    a fast-closing switch positioned between the electrode and the ground.

13. The electromagnetic energy source according to claim 12, where the sonde assembly extends from a downhole end of the tubular member.

14. The electromagnetic energy source according to claim 12, where the communication cable extends through the tubular member to a surface and the communication cable provides a signal to the electrode.

* * * * *